Inventor:
Karl Salna

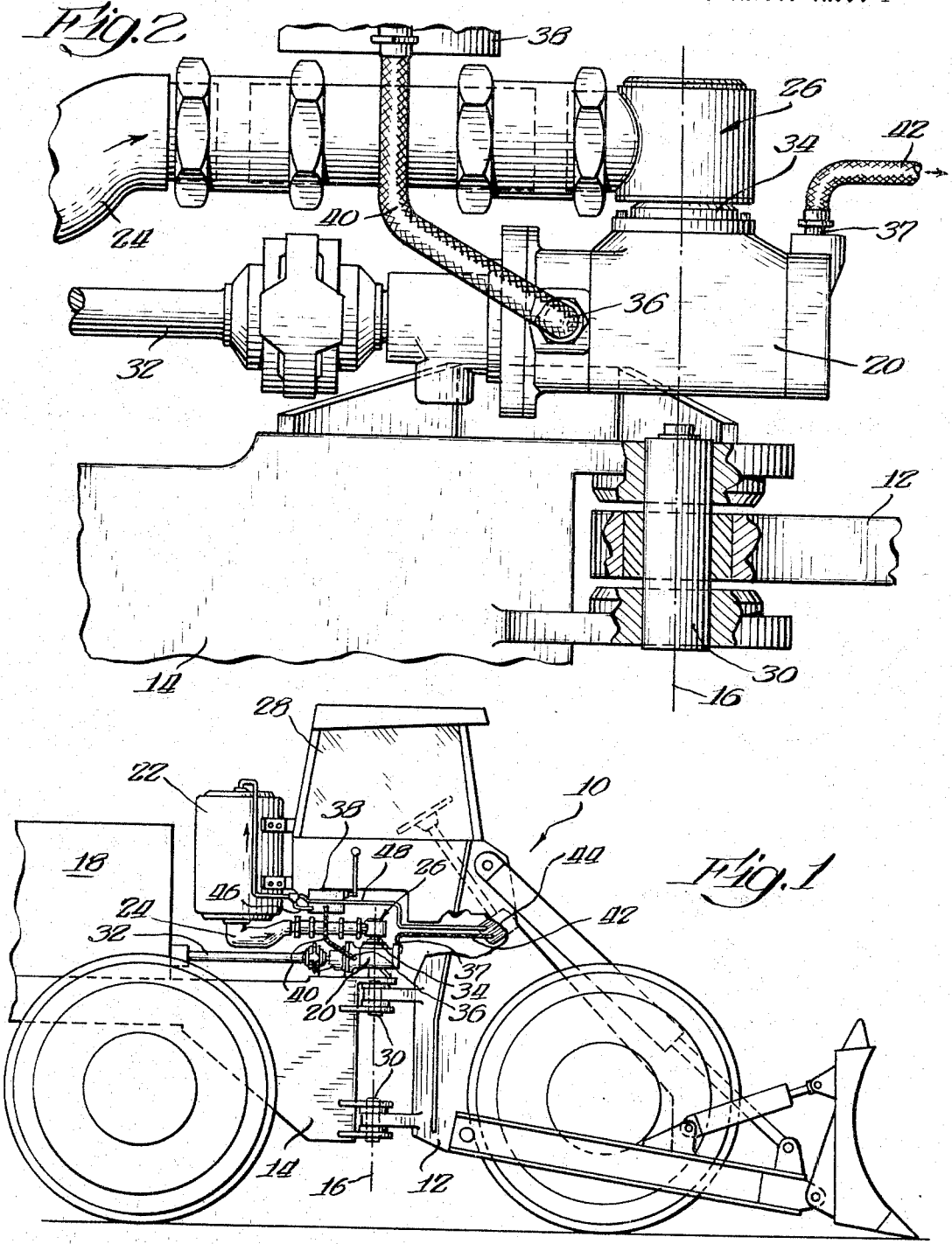

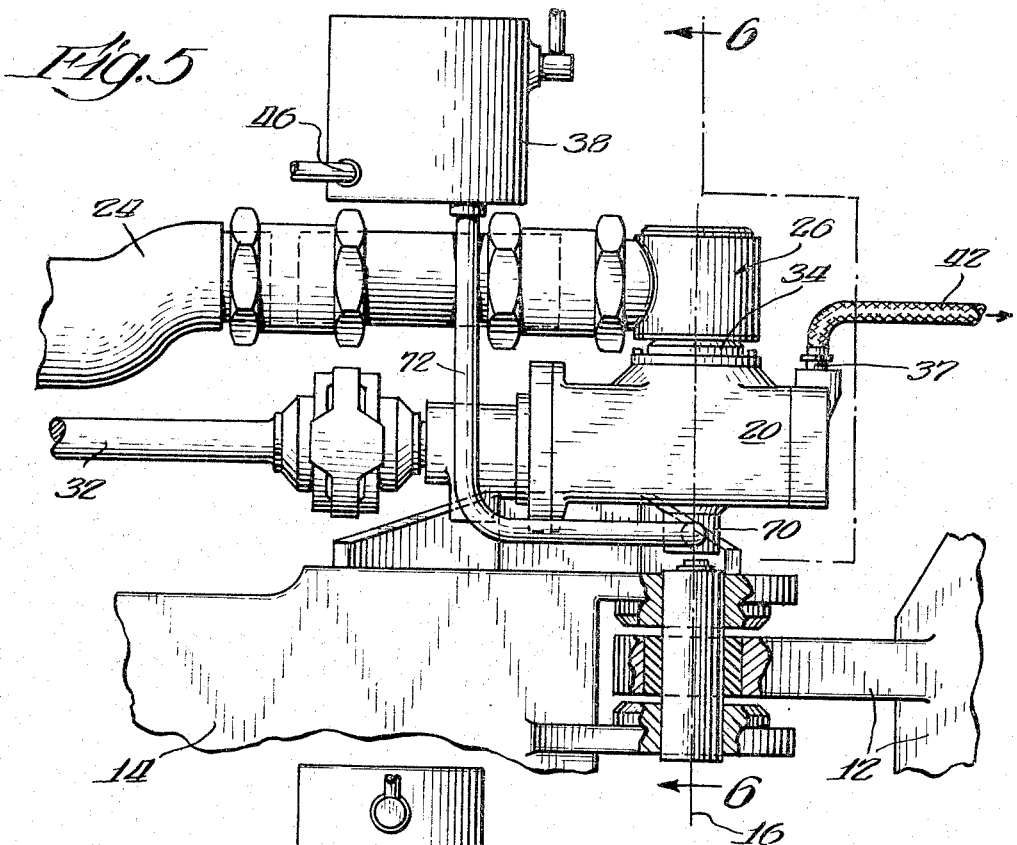
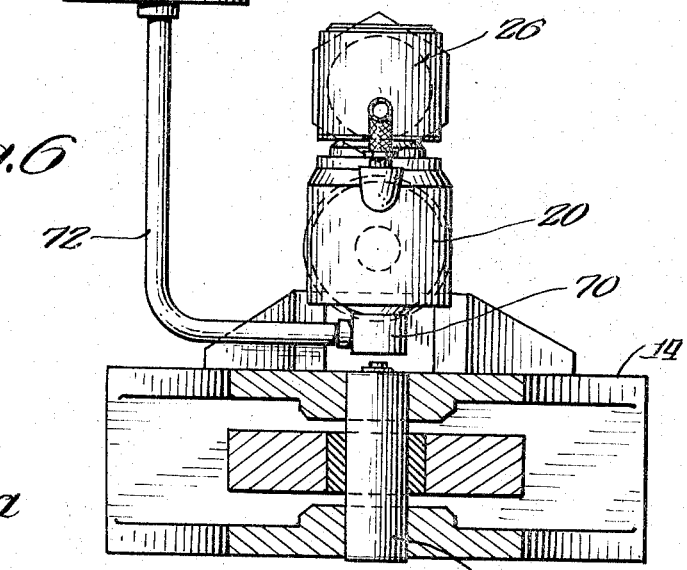

United States Patent Office 3,329,232
Patented July 4, 1967

3,329,232
HYDRAULIC SYSTEM FOR ARTICULATED
TRACTOR
Karl Salna, Mundelein, Ill., assignor to International
Harvester Company, a corporation of Delaware
Filed Dec. 10, 1965, Ser. No. 512,847
8 Claims. (Cl. 180—79.2)

The present invention relates to hydraulic systems for articulated material handling vehicles.

It is an object of the present invention to provide an improved hydraulic system in an articulated tractor providing improved positioning of the hydraulic components on the vehicle and improved connections between these hydraulic components.

A more specific object of the invention is to provide a novel articulated material handling vehicle which provides an improved hydraulic pump drive, and has hydraulic pump connections with improved operating reliability and component life.

Further objects, advantages and features of the invention pertain to the particular arrangement and structure whereby the above and other objects of the invention are attained. The invention both as to its structure and mode of operation, will be better understood by reference to the following disclosure and the drawings forming a part thereof, wherein:

FIG. 1 is a side view of an exemplary articulated material handling vehicle in accordance with the present invention;

FIG. 2 is an enlarged side view of a portion of the vehicle of FIG. 1;

FIG. 5 illustrates another embodiment of the invention in a view corresponding to FIG. 2; and FIG. 6 is a front view of the embodiment of FIG. 5.

Figure 3:
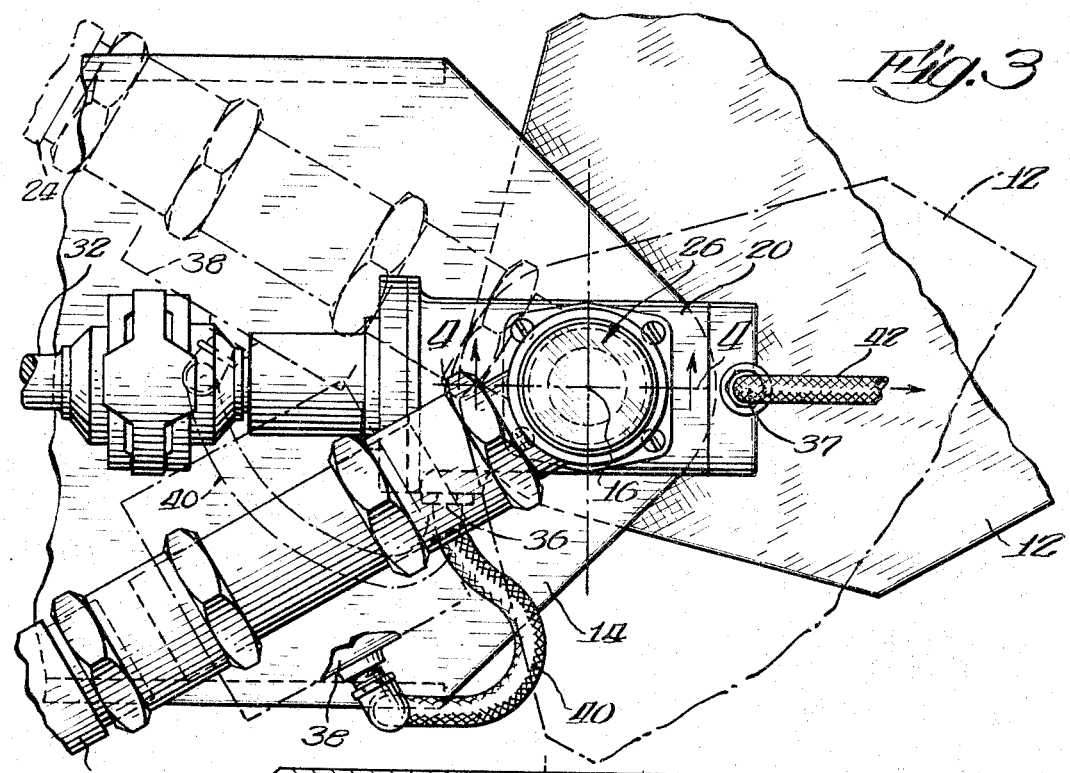
FIG. 3 is a plan view of that portion of the vehicle of FIG. 1 illustrated in FIG. 2.

To achieve a more even distribution of weight in an articulated material handling vehicle it is necessary to place the engine on the chassis opposite the chassis on which the hydraulically actuated implement is attached, e.g., if a bucket is mounted on the front chassis the engine should be on the rear chassis. The mechanical power available to drive a hydraulic pump is therefore on the rear chassis and essentially all the hydraulic requirements are on the front chassis. Since steering of an articulated vehicle is accomplished by pivoting the front and rear chassis relative to each other, it has been necessary to either provide a flexible drive means from the engine on the rear chassis to a pump mounted on the front chassis, or to provide numerous flexible conduits between a pump on the rear chassis and the hydraulic components on the front chassis. Either of these two arrangements has been found to be disadvantageous from the standpoint of wear and/or reliability.

Turning now to the drawings, and initially to FIG. 1, there is shown therein an exemplary articulated material handling vehicle 10 in accordance with the present invention. The articulated vehicle 10 has two separate chassis, a front chassis 12 and rear chassis 14. The two chassis are rotatably connected to provide the desired articulation about an axis of rotation 16. It will be seen that the engine 18 and a hydraulic pump 20 driven thereby are preferably mounted upon the rear chassis 14. Conversely, all the hydraulic control means for the vehicle 10 and a hydraulic reservoir 22 are preferably secured to the front chassis 12. The hydraulic pump and engine being mounted on the same chassis, the need for a flexible drive for the pump is eliminated. The disadvantage inherent in a flexible conduit between the reservoir 22 and the hydraulic pump 20 are eliminated by providing a relatively rigid conduit 24 which has a single rotatable coupling 26 therein. The coupling 26 allows complete articulation between the front and rear chassis by virtue of its location co-axial the axis of rotation 16 between the two chassis. Thus the coupling 26 permits a rigid conduit with a pure rotation swivel connection. The flexible outlet conduits from the pump 20 may be eliminated also, as shown in FIGS. 5 and 6, by providing additional swivel joints in similar axial alignment with the vehicle hinge-line.

It will be appreciated in the following description that numerous structural details of the articulated vehicle 10 are preferably of a conventional construction and accordingly need not be described herein. Thus, for example, the engine 18, the hydraulic pump 20, the reservoir 22 and the details of the front and rear chassis need not be described herein, as suitable structure therefor will be well known to those skilled in the art.

Considering the vehicle 10 in more detail, it may be seen that the pump 20 is directly secured to the forward-most portion of the rear chassis 14, so that it in fact extends underneath the over-hanging cab 28 on the front chassis 12. The preferred location of the pump 20 is overlying the axis of rotation 16 between the front and rear chassis, i.e., overlying the pins 30 which hingedly secured the two chassis together. Since they are both on the rear chassis, the pump 20 is preferably driven directly by the engine 18 through a rigid drive shaft 32.

The hydraulic pump 20 preferably has a large inlet 34, fed by the conduit 24, a large outlet 36 and a smaller outlet 37. The outlet 36 may connect through a flexible hydraulic pressure hose 40 to a loader valve 38, with which the operator controls the movement of the vehicle blade. The smaller outlet 37 is connected through a second flexible pressure hose 42 to a steering control valve 44.

The reservoir 22 is preferably secured to the front chassis 12. The precise location thereon is not important. In a present example the reservoir 22 is mounted at the rear of the cab 28 and thus overlies the rear chassis 14. It is desirable to have the reservoir mounted to the front framework, since the hydraulic valves, pistons and other hydraulic controls are on the front chassis and therefore non-flexible hydraulic return lines may be used, i.e., the numerous lines returning from the hydraulic components to the reservoir may all be of rigid conduit, as for example the return line 46 from the loader valve 38 and the return line 48 from the steering control valve 44. The replacement of flexible lines with rigid lines increases the reliability and life of the hydraulic lines in the vehicle since flexible lines are much more subject to heat, fatigue and decomposition.

With the reservoir 22 on the front chassis and the hydraulic pump 20 on the rear chassis, it may be seen that the return line conduit 24 therebetween must allow for the relative movement between the two chassis. The conduit 24 must be of a relatively large diameter since all of the hydraulic fluid drawn by the pump from the reservoir must pass therethrough. Additionally, the pressure in the conduit 24 substantially fluctuates during the operation of the vehicle 10. Thus, depending on the operation of the hydraulic controls, there may be a high internal pressure which may then rapidly drop to a very low pressure or even a vacuum. To provide a flexible hose which will withstand these conditions is difficult since a hose of sufficient diameter and strength would have substantial resistance to flexing and problems of strain and fatigue.

Figure 4:
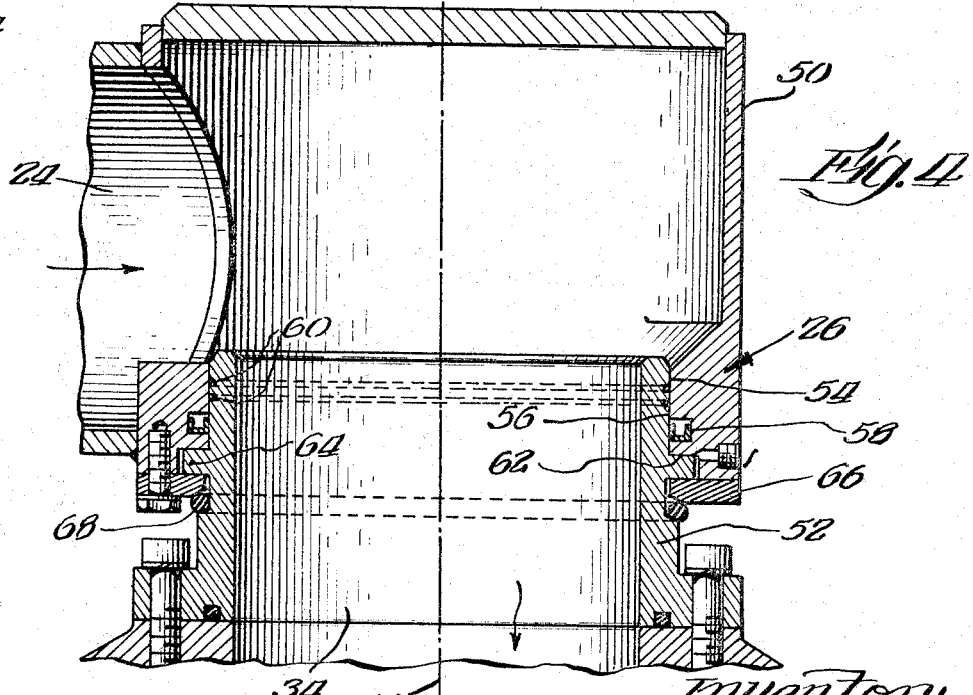
FIG. 4 is a cross-sectional view taken along the line 4—4 of FIG. 3.

The articulated vehicle 10 overcomes the above problems by a component arrangement and structure which allows a rigid conduit 24 yet provides a flexible inner chassis connection without substantial resistance by means of a single rotatable or swivel coupling 26. A preferred construction of this coupling 26 is illustrated in cross-section in FIG. 4. It may be seen that the main portion of the rigid conduit 24 is secured to a hollow swivel cap 50. The swivel cap 50 is mounted rotatably in a fluid type relationship over a tubular base 52. The base 52 is in turn rigidly secured to the housing of the hydraulic pump 20 over the pump inlet 34. The swivel cap 50 is rotatable with respect to the tubular base 52 about an axis of rotation which is positioned to coincide with the axis of rotation 16 between the front and rear chassis. As the two chassis rotate with respect to one another, as shown in FIG. 3, the entire return conduit 24 is free to rotate about the axis of rotation 16 and movement therein occurs only at the connection between the swivel cap 50 and the tubular base 52.

Considering now the preferred details of the rotatable coupling 26, it may be seen that the swivel cap 50 has a smooth cylindrical surface 54 which closely fits around a corresponding annular surface 56 on the base 52. Thus there is a substantial area of close fitting rotatable bearing surface between the two components. To provide a sufficiently fluid tight connection capable of withstanding the severe pressure fluctuations in the coupling 26 special sealing features are preferably provided. It may be seen that the annular surface 54 in the swivel cap 50 is annularly recessed to contain a continuous U-cup seal 58, which continuously bears against the annular surface 56. A U-cup seal is preferred since the sealing force which it exerts against the annular surface 56 is a function of the fluid pressure therein. It may be seen that the U-cup is preferably spaced a substantial distance downwardly on the annular surfaces 54 and 56 from the upper or internal ends thereof. Fluid escaping between the annular surfaces 54 and 56 passes into the U-cup seal 58.

Preferably there is additionally provided in the annular surface 56 above (inwardly of) the U-cup seal 58 at least two small annular grooves 60. The grooves 60 provide several important functions. First they provide lubrication for the coupling 26 since fluid escaping between the two annular surfaces is retained therein and distributed thereby evenly around the surfaces. Secondly the grooves 60 serve to balance the pressure between various portions of the two annular surfaces to prevent scoring and provide a better fit between the cap and the base. Such pressure differences may be caused by minor movements or misalignments in the connections between the front and rear chassis. A third function of the grooves 60 is to reduce pressure fluctuations on the U-cup seal 58. The grooves 60 serve to even out or dampen the peak pressure build-ups which occur in the conduit 24. This provides better sealing and prevents, for example, the fluid from being drained from the seal during temporary vacuum conditions which may occur in the conduit 24.

Limited relative movement between the cap 50 and the base 52 will not impair the fluid seal provided by the disclosed structure. However, large scale vertical movements are prevented by a suitable arrangement such as that shown. A shoulder 62 on the swivel cap rests against the upper surface of an annularly projecting flange 64, and a bronze flange 66 is fastened to the base of the swivel cap 50 abutting the underside of the flange 64. An O ring 68 may be provided under the bronze flange 66 to retain any leakage through the U-cup seal 58 so that it will provide lubrication for the various rotational surfaces.

It may be seen from the above description that the rotatable coupling 26 is the sole rotatable coupling or flexure provision needed in the return conduit 24. All other connections therein including the connection to the reservoir 22 may be completely rigid and sealed connections. It will be appreciated that it is not essential that the rotatable coupling 26 be located coaxially of the axis of rotation 16 by directly mounting it over the pump inlet 34, i.e., the pump inlet 34 could be located elsewhere providing the rotatable coupling 26 itself is located co-axially of the axis of rotation 16. This would of course require an additional rigid conduit extending from the rotatable coupling 26 to the inlet 34 and is therefore not as desirable as the disclosed embodiment.

Considering now the further embodiment illustrated in FIGS. 5 and 6, it may be seen that the components and their location thereof are identical in almost all respects to that of the previously described articulated vehicle 10. However, in this modification of the invention there is an additional rotatable coupling 70 which eliminates the flexible pressure hose 40 (shown in FIGS. 1–3) between the large pump outlet 36 and the loader valve 38. This rotatable coupling 70 is preferably similar in construction, function and location to the rotatable coupling 26. The rotatable coupling 70 is located so that its axis of rotation is in alignment with the axis of rotation 16 between the front and rear chassis. Accordingly, the flexible pressure hose 40 is replaced by a rigid conduit 72. It will be noted that a similar rotatable coupling and rigid conduit may be employed to replace the flexible pressure hose 42 as well.

It is clear that there has been provided herein an articulated vehicle 10 with an improved and more reliable hydraulic system. It is contemplated that further variations and modifications within the purview of those skilled in the art can be made herein and it is intended to cover in the appended claims all such variations and modifications as fall within the true spirit and scope of the invention.

What is claimed is:

1. In combination: an articulated material handling vehicle comprising a first chassis pivotally connected to a second chassis about a substantially vertical pivot axis; an engine mounted on the second chassis; a hydraulic pump mounted on the second chassis and driven by the engine, the pump having an inlet and at least one outlet; and, conduit means fluidly connecting the pump inlet with a reservoir mounted on the first chassis, the conduit means including first and second inter-communicating coupling elements relatively rotatable coaxially with the pivot axis.

2. An articulated material handling vehicle as defined in claim 1 wherein: the first coupling element comprises a first annular surface having at least one fluid retaining annular groove; and, the second coupling element comprises a second annular surface in closely fitting complementary relation to the first surface.

3. An articulated material handling vehicle as defined in claim 2 and further including: pressure responsive fluid seal means annularly disposed between the first and second coupling members.

4. An articulated material handling vehicle as defined in claim 1 wherein: the first coupling element comprises a first annular surface, and the second coupling element comprises a second annular surface in close fitting complementary relation with the first surface and having an annular groove; and further including an annular U-shaped seal positioned in the groove with its open end facing against the direction of fluid flow from the pump.

5. An articulated material handling vehicle as defined in claim 4 wherein: the second surface has at least one fluid retaining annular groove.

6. An articulated material handling vehicle as defined in claim 1 wherein: the inlet is positioned coaxially with the pivot axis; the first coupling element is mounted on the inlet and in fluid communication therewith; and, the second coupling element is in fluid communication with the reservoir.

7. An articulated material handling vehicle as defined in claim 1 and further including: at least one hydraulic operating means mounted on the vehicle; and, other conduit means fluidly connecting the outlet with the operating means, the other conduit means including interconnecting coupling elements relatively rotatable coaxially with the pivot axis.

8. An articulated material handling vehicle as defined in claim 7 wherein: the hydraulic operating means includes a hydraulic motor for pivoting the first chassis relative to the second chassis about the axis.

References Cited

UNITED STATES PATENTS

| 3,134,628 | 5/1964 | Lackey et al. | 180—79.2 X |
| 3,151,694 | 10/1964 | Rogers | 180—79.2 X |
| 3,246,778 | 4/1966 | Kampert et al. | 214—776 |
| 3,263,767 | 8/1966 | Rockwell | 180—51 X |

BENJAMIN HERSH, *Primary Examiner.*

J. H. BRANNEN, *Assistant Examiner.*